(12) United States Patent
Amberg

(10) Patent No.: US 6,889,005 B2
(45) Date of Patent: *May 3, 2005

(54) FLUID HEATER WITH COMPRESSIBLE COVER FREEZE PROTECTION

(75) Inventor: Michael T. Amberg, Fenton, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/408,088

(22) Filed: Apr. 4, 2003

(65) Prior Publication Data

US 2004/0197094 A1 Oct. 7, 2004

(51) Int. Cl.⁷ .................................................. F24H 1/10
(52) U.S. Cl. ...................................... 392/484; 137/334
(58) Field of Search ................................ 392/465–485; 137/334–341

(56) References Cited

U.S. PATENT DOCUMENTS

| | | |
|---|---|---|
| 653,629 A | 7/1900 | Schneider |
| 941,215 A | 11/1909 | Wade |
| 1,523,156 A | 1/1925 | Adams |
| 1,636,190 A | 7/1927 | Mattoney |
| 2,833,909 A | 5/1958 | Levey .......................... 219/39 |
| 3,014,251 A | 12/1961 | Sstern ......................... 20/40.5 |
| 3,202,447 A | 8/1965 | Whaley ...................... 294/87.2 |
| 3,292,866 A | 12/1966 | Benner ....................... 239/284 |
| 3,332,045 A | 7/1967 | Rodaway ..................... 335/81 |
| 3,489,884 A | 1/1970 | Wasekeski ................... 219/522 |
| 3,553,428 A | 1/1971 | McGhee ...................... 219/494 |
| 3,632,042 A | 1/1972 | Goulish ....................... 239/130 |
| 3,668,757 A | 6/1972 | Rieden ........................ 29/157.3 |
| 3,756,510 A | 9/1973 | Nitterl ......................... 239/129 |
| 3,785,359 A | 1/1974 | Whittaker ................... 126/19.5 |
| 3,888,412 A | 6/1975 | Lundo .................... 237/12.3 B |
| 3,891,827 A | 6/1975 | Wyse .......................... 219/302 |
| 3,977,436 A | 8/1976 | Larmor ................... 137/625.65 |
| 3,979,068 A | 9/1976 | Applebaum ............. 239/284 R |
| 4,106,508 A | 8/1978 | Berlin ......................... 128/346 |
| 4,159,026 A | 6/1979 | Williamson .............. 137/625.5 |
| 4,177,375 A | 12/1979 | Meixner ...................... 219/441 |
| 4,199,675 A | 4/1980 | Sharpless |
| 4,212,425 A | 7/1980 | Schlick ........................ 239/133 |
| 4,248,383 A | 2/1981 | Savage ........................ 239/284 |
| 4,253,493 A | 3/1981 | English .................. 137/625.18 |
| 4,295,111 A | 10/1981 | Frosch ........................ 335/256 |
| 4,295,769 A | 10/1981 | Douthett ...................... 411/411 |
| 4,306,589 A | 12/1981 | Harned .................. 137/625.65 |
| 4,358,652 A | 11/1982 | Kaarup ..................... 219/10.55 |
| 4,403,756 A | 9/1983 | Berlin ......................... 244/223 |
| 4,417,116 A | 11/1983 | Black |
| 4,430,994 A | 2/1984 | Clawson ................. 128/203.27 |
| 4,489,863 A | 12/1984 | Horchos ...................... 222/504 |
| 4,524,797 A | 6/1985 | Lungu ......................... 137/343 |
| 4,534,539 A | 8/1985 | Dettmann ..................... 251/65 |

(Continued)

FOREIGN PATENT DOCUMENTS

| | | |
|---|---|---|
| CA | 1216713 | 1/1987 |
| CA | 2133592 | 4/1995 |
| CA | 2176539 | 11/1997 |

(Continued)

Primary Examiner—Thor Campbell
(74) Attorney, Agent, or Firm—Young & Basile, P.C.

(57) ABSTRACT

A fluid heater apparatus supplies heat to wash fluid via a flow path in a thermally conductive body. A heat source is disposed in the thermally conductive body for imparting heat to the body. Fluid in a flow path in the thermal body enveloping the heat source absorbs heat from the body. A fluid expansion member is fixed to the mass over the open ends of the fluid flow path in the thermal body. The fluid expansion member is formed of a compressible foam material having shape memory. The fluid expansion member is sealingly joinable by fasteners to the thermal body through bores formed in the peripheral edge of the member.

63 Claims, 9 Drawing Sheets

U.S. PATENT DOCUMENTS

| | | | | |
|---|---|---|---|---|
| 4,561,632 | A | 12/1985 | Hugler | 251/129.15 |
| 4,574,841 | A | 3/1986 | Hugler | 137/625.44 |
| 4,589,374 | A | 5/1986 | Farina | 122/14 |
| 4,669,430 | A | 6/1987 | Reinhold | 123/179 |
| 4,689,548 | A | 8/1987 | Mechlemburg | 323/243 |
| 4,690,371 | A | 9/1987 | Bosley | 251/65 |
| 4,832,262 | A | 5/1989 | Robertson | 239/129 |
| 4,858,576 | A | 8/1989 | Jeffries | 123/145 |
| 4,877,186 | A | 10/1989 | Scholl | 239/75 |
| 4,894,520 | A | 1/1990 | Moran | 219/497 |
| 4,905,904 | A | 3/1990 | Ohara | 239/284.1 |
| 4,927,060 | A | 5/1990 | Snowball | 222/146.5 |
| 4,975,630 | A | 12/1990 | Ma | 323/300 |
| 5,012,977 | A | 5/1991 | Karklins | 239/284.1 |
| 5,074,471 | A | 12/1991 | Baumgarten | 239/284.1 |
| 5,168,595 | A | 12/1992 | Naylor, Jr. | 15/250.4 |
| 5,180,896 | A | 1/1993 | Gibby | 219/10.55 |
| 5,183,099 | A | 2/1993 | Bechu | 165/41 |
| 5,247,148 | A | 9/1993 | Mencher | 219/10.55 |
| 5,249,623 | A | 10/1993 | Miller | 165/156 |
| 5,254,083 | A | 10/1993 | Gentelia et al. | 604/35 |
| 5,280,806 | A | 1/1994 | Glazebrook | 137/517 |
| 5,289,698 | A | 3/1994 | Garimella | 62/498 |
| 5,318,071 | A | 6/1994 | Giaardo | 137/625.65 |
| 5,345,968 | A | 9/1994 | Day | 137/625.46 |
| 5,351,934 | A | 10/1994 | Jensen | 251/65 |
| 5,354,965 | A | 10/1994 | Lee | 219/202 |
| 5,369,247 | A | 11/1994 | Doljack | 219/485 |
| 5,383,247 | A | 1/1995 | Nickel | 15/250.04 |
| 5,421,727 | A | 6/1995 | Stevens | |
| 5,428,206 | A | 6/1995 | Uchida | 219/505 |
| 5,433,382 | A | 7/1995 | Baumgarten | 239/284.1 |
| 5,598,502 | A | 1/1997 | Takahashi | 392/502 |
| 5,636,407 | A | 6/1997 | Len | 15/250.19 |
| 5,673,360 | A | 9/1997 | Scripps | 392/405 |
| 5,676,868 | A | 10/1997 | Simmons | 219/202 |
| 5,727,769 | A | 3/1998 | Suzuki | 251/129.15 |
| 5,784,751 | A | 7/1998 | Tippets | 15/250.04 |
| 5,881,428 | A | 3/1999 | Simmons | 15/250.04 |
| 5,927,608 | A | 7/1999 | Scorirobli | 239/284.1 |
| 5,947,348 | A | 9/1999 | Briski | 222/640 |
| 5,979,796 | A | 11/1999 | Ponziani | 239/284.1 |
| 5,988,529 | A | 11/1999 | Suhring | 239/284.1 |
| 6,009,369 | A | 12/1999 | Boisvert | 701/99 |
| 6,119,300 | A | 9/2000 | Schmid | 15/250.04 |
| 6,148,258 | A | 11/2000 | Boisvert | 701/99 |
| 6,199,587 | B1 | 3/2001 | Shlomi | 137/625.5 |
| 6,236,019 | B1 | 5/2001 | Piccione | 219/203 |
| 6,247,653 | B1 | 6/2001 | Seyfarth | 239/284.1 |
| 6,257,500 | B1 | 7/2001 | Petzold | 239/284.1 |
| 6,260,608 | B1 | 7/2001 | Kim | 165/41 |
| 6,271,506 | B1 | 8/2001 | Glaser | 219/505 |
| 6,782,196 | B1 * | 8/2004 | Kuebler et al. | 392/484 |
| 2002/0040895 | A1 | 4/2002 | Lopez et al. | |
| 2002/0137455 | A1 | 9/2002 | Ivanov | |

FOREIGN PATENT DOCUMENTS

| | | |
|---|---|---|
| DE | 854 403 | 11/1952 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 195 04 470 | 8/1996 |
| DE | 19820220 | 11/1999 |
| DE | 19935134 | 1/2001 |
| DE | 100 63 851 | 7/2002 |
| EP | 1 006 029 | 11/1999 |
| EP | 1 006 030 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2 707 230 | 7/1993 |
| GB | 370687 | 5/1931 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2 308 971 | 7/1997 |
| GB | 2 310 795 | 9/1997 |
| GB | 2320086 | 6/1998 |
| GB | 2 331 231 | 5/1999 |
| GB | 2354 688 | 11/2000 |
| GB | 2 350 555 | 12/2000 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |

* cited by examiner

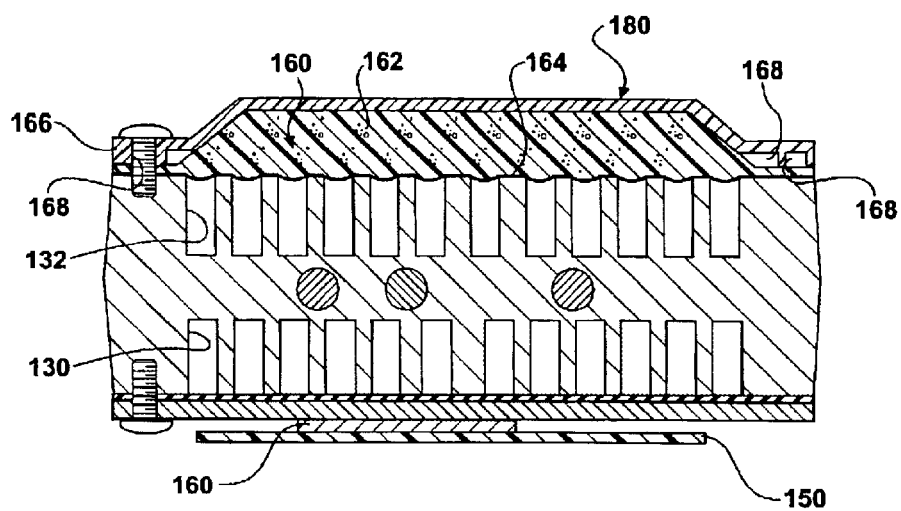
FIG - 14
FIG - 15
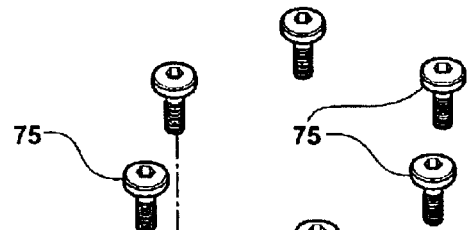
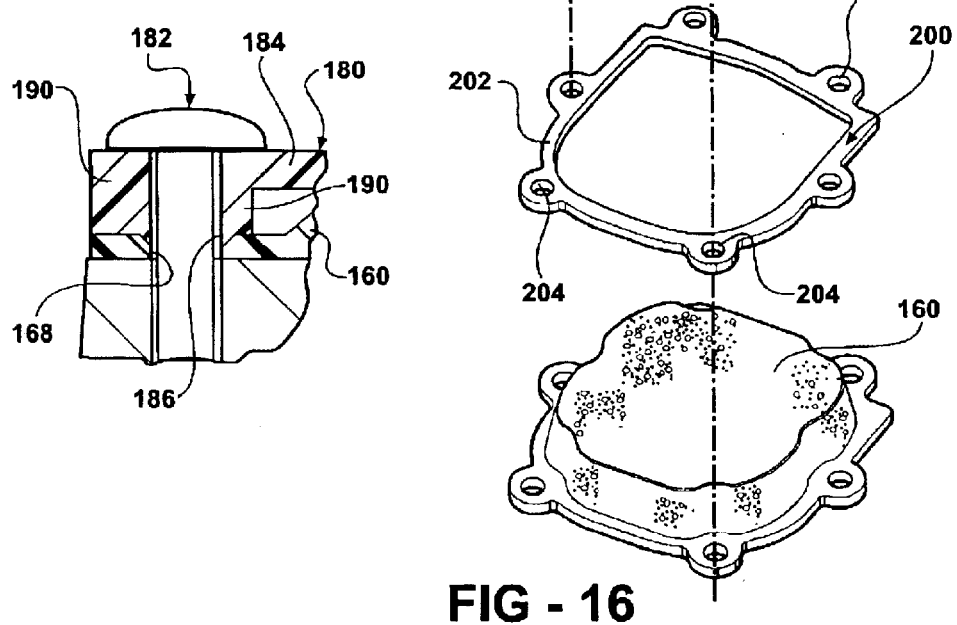
FIG - 16

FLUID HEATER WITH COMPRESSIBLE COVER FREEZE PROTECTION

BACKGROUND

This invention relates, in general, to fluid heater apparatus and, more particularly, to fluid heater apparatus which provides a heated wash fluid to a cleanable surface, and, still more specifically, to a heated wash fluid apparatus for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. Various wash fluid heating devices have been developed, but all typically utilize a heat exchanger design wherein a heat source is disposed in a body through which the wash fluid flows. The wash fluid picks up heat in the heat exchange body which elevates its temperature prior to dispersion through the spray nozzle onto a vehicle window.

A vehicle wash device is subject to a wide range of temperatures and types of fluid. It is possible and fairly common that consumers may use only water as a vehicle wash fluid. However, at sub-freezing conditions, this may result in damage to the fluid storage device due to expansion caused by the phase change of water to a solid state. The resulting damage may cause leaks, fractures, yield of materials, or a general malfunction of the fluid heater.

Thus, it would be desirable to provide a fluid heater apparatus providing a heated fluid which has fluid freeze protection. It would also be desirable to provide a fluid heater apparatus which provides freeze protection without a substantial increase in the number of components employed in the fluid heater apparatus.

SUMMARY

The present invention is a fluid heater apparatus with unique freeze protection means. The freeze protection means uniquely reversibly allows expansion of the fluid in the fluid heater when the fluid undergoes a phase change to a solid or semi-solid state and is reversible to a normal position overlaying the fluid flow channels in a thermally conductive mass when the fluid reverses phase back to a liquid state.

In one aspect, the heater apparatus includes a thermally conductive mass, heating means thermally coupled to the thermally conductive mass for imparting heat to the thermally conductive mass, and a fluid flow path formed in the thermally conductive mass between an inlet and an outlet. Fluid in the fluid flow path absorbs heat from the thermally conductive mass.

In one aspect, the heater apparatus further includes a fluid expansion means coupled to a thermally conductive mass. The fluid flow path is open to the exterior of the thermally conductive mass. The fluid expansion means is disposed over the fluid flow path in the thermally conductive mass for reversibly allowing expansion of the fluid in the fluid flow path when the fluid undergoes a phase change to a solid state. The fluid expansion means has a peripheral edge. Means are provided for fixing the edge of the fluid expansion means to the thermally conductive mass.

In one aspect, the fluid expansion means or element is formed of a compressible material, such as a closed cell foam.

In another aspect, the fluid expansion element formed of a closed cell foam material having a low density central portion overlaying the fluid flow paths in the thermal conductive mass and a peripheral edge portion which is subjected to additional heat and/or pressure to form a reduced height, higher density portion capable of receiving fasteners for securing the element to a surface of the thermally conductive mass.

In one aspect, compression means are employed to compressibly seal the fluid expansion element to one surface of the thermal conductive mass. In one aspect, the compression means is a rigid member having a shape complementary to the shape of the peripheral edge of the fluid expansion element. The rigid member is secured by the fixing means or fasteners to the fluid expansion means and the thermal mass to apply compressive force to the element to sealingly attach the fluid expansion element to the thermal mass.

In another aspect, the compression means is a rigid plate, preferably formed of a plastic, which has a shape substantially complementary to the shape of the entire outer surface of the fluid expansion element. The plate is also affixed by the fixing means or fasteners to the thermal mass to apply compressive force to substantially the entire fluid expansion element.

In another aspect, the present invention is a wash apparatus including a fluid reservoir contain a wash fluid, a pump coupled to the fluid reservoir for pumping fluid from the reservoir, a spray nozzle fluidically coupled to the pump for discharging fluid pumped from the reservoir onto a cleanable surface, and the heater apparatus disposed in fluid flow communication between the pump, the reservoir and the nozzle.

In this aspect, a fluid expansion means carried in the housing for reversibly allowing expansion of fluid in the fluid flow path as the fluid changes phase to a solid state.

The fluid heater of the present invention has a unique freeze protection means which accommodates phase change expansion of the fluid in the fluid heater when the fluid transitions in phase to a semi-solid or solid state, but is capable of returning to a normal shape and position sealingly overlaying open ends of the fluid flow channels in the thermally conductive mass when the fluid reverses phase to a liquid state. The fluid expansion means is easily accommodated in a fluid heater apparatus without adding a substantial number of components.

BRIEF DESCRIPTION OF THE DRAWING

The various features, advantages and other uses of the present invention will become more apparent by referring to the following detail description and drawing in which:

FIG. 14 is a cross-sectional view generally taken along line 14—14 in FIG. 11 and depicting another aspect of the present invention;

FIG. 15 is an enlarged cross-sectional view of a portion of the apparatus depicted in FIG. 14; and FIG. 16 is a perspective view of another aspect of the present invention.

DETAILED DESCRIPTION

Figure 1:
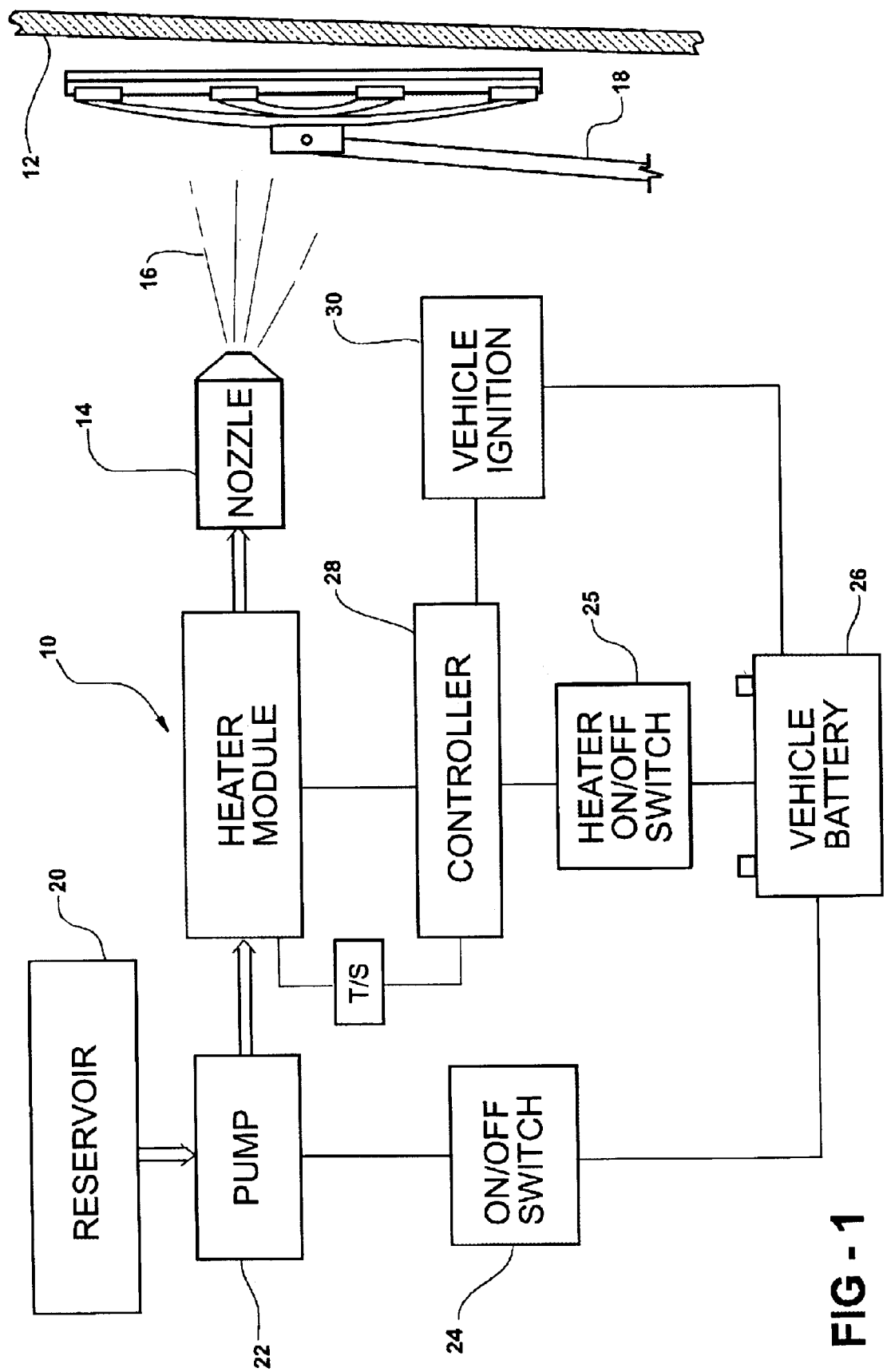
FIG. 1 is a block system diagram of a fluid heater apparatus according to the present invention used in an exemplary vehicle window wash fluid delivery system.
Figure 2:
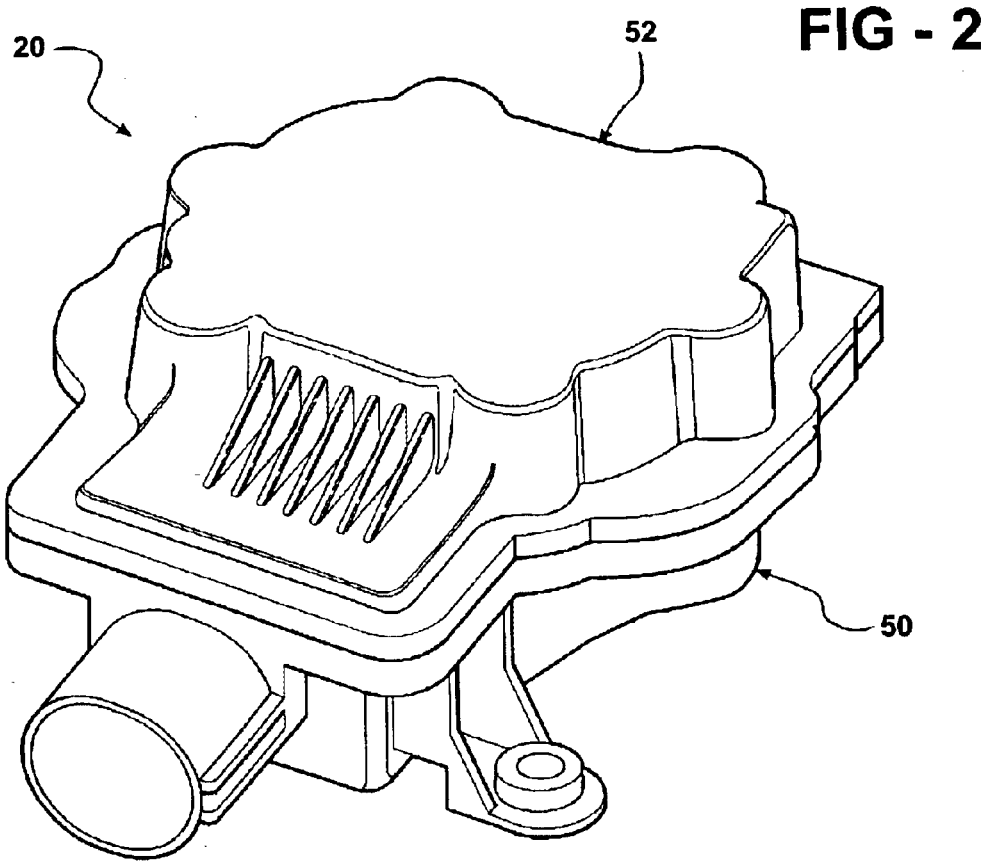
FIG. 2 is a perspective view of a heater module of the fluid heater apparatus according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is suppled with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 65° to about 70° C., by example only, by the heater module 10. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–12, there is depicted one aspect of the heater module 10 according to the present invention.

The heater module 10 includes a heat exchange mass or body 40 formed of a suitable high thermally conductive material. Although the mass 40 is described as being formed of die-cast, molded, cast, sintered, or machined aluminum, other materials, either homogenous or nonhomogeneous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, each receives a fitting 46 for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange mass 40 is disposed within an enclosure formed by a first cover 50 and a mating second cover 52. The first and second covers 50 and 52 have complementary mating edges. The first cover 50 has a major wall surface 54 and a surrounding peripheral lip 60.

A necked-down end portion 64 is formed in the first cover 50, and forms a tubular extension from one portion of the major wall surface 54. The necked-down portion 64 forms an enclosure for receiving a connector assembly 70 which provides electrical signals and power to the heating element(s) mounted in the joined first and second covers 50 and 52 and to a circuit board, described in detail hereafter.

The second cover 52 also has a major wall surface 56 and a surrounding peripheral lip 62 projecting therefrom. The peripheral lip 62 surrounds the entire periphery of the second major wall surface 56.

The first and second covers 50 and 52 are fixedly joined together, after the thermal mass 40 and the connector assembly 70 has been disposed within the first and second covers 50 and 52 by suitable means, such as by heat, sonic or vibration welding. By example, a peripheral groove 76 projects at least partially around the entire edge of the peripheral lip 60. The groove 76 receives a mating projection 77 extending around the peripheral lip 62 of the second cover 52. The projection 77 and groove 76 are fixedly and sealingly joined together by welding to fixedly join the covers 50 and 52 together.

As shown in detail in FIGS. 6–11, the heat exchange mass 40 has a solid cubical shape formed of a first major surface 80, a second opposed major surface 82, and four sidewall portions 84, 86, 88 and 90, interconnecting the first and second surfaces 80 and 82.

A plurality of bores 92, 94 and 96 are formed in the body 40 and project inwardly from the sidewall 84. The bores 92, 94 and 96 are each adapted for receiving one generally cylindrical heater element. As partially shown in FIG. 11, each bore 92, 94 and 96 extends through the solid central portion of the mass 40 so as to be completely surrounded by the solid material of the mass 40. This defines the mass 40 as a heat source after receiving heat from the heater elements mounted in each bore 92, 94 and 96.

In the invention, the heater elements may be formed of "calrod". Although different materials may be used, one example of a calrod construction is a Nichrome wire inside of a stainless steel sheath.

By way of example only, at least one and preferably a plurality, i.e., two or three or more individual heater elements 100, 102 and 103, are disposed in the bores 92, 94 and 96, respectively. The function of the one or more heater elements, such as heater elements 100, 102 and 103 will be described hereafter in conjunction with a description of the operation of the heater module 10.

Figure 4:
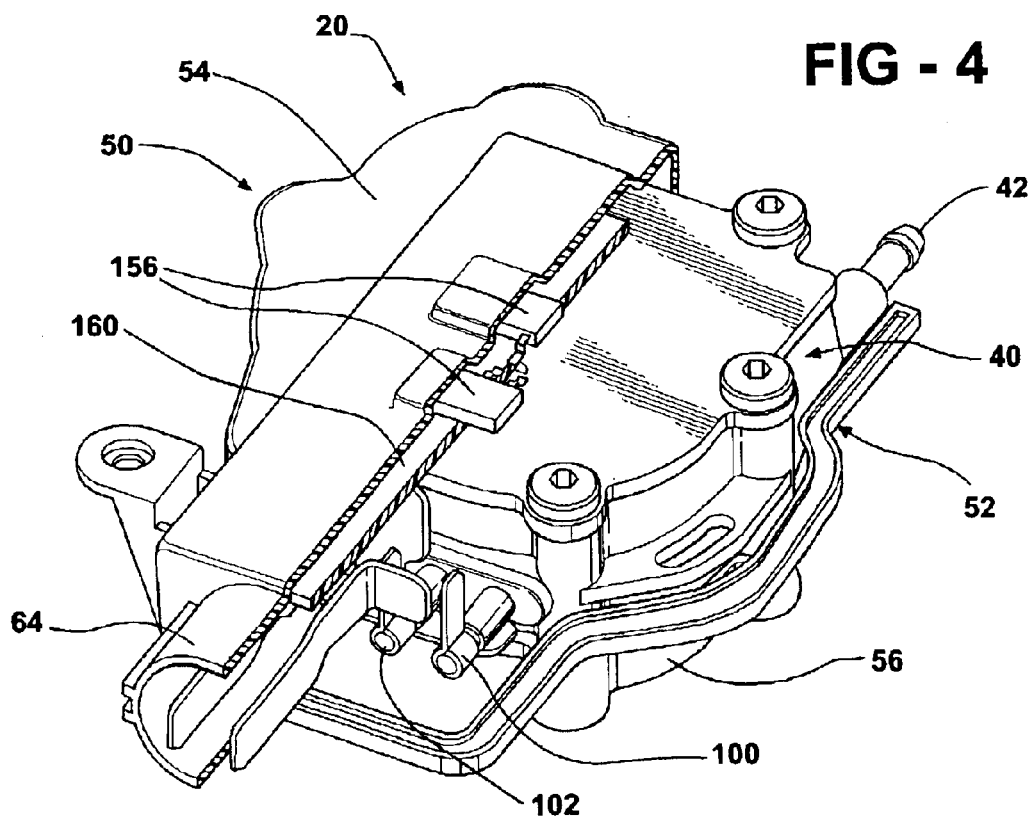
FIG. 4 is a partially broken away, perspective view of the heater module shown in FIG. 2, oriented with the circuit board upward.
Figure 7:
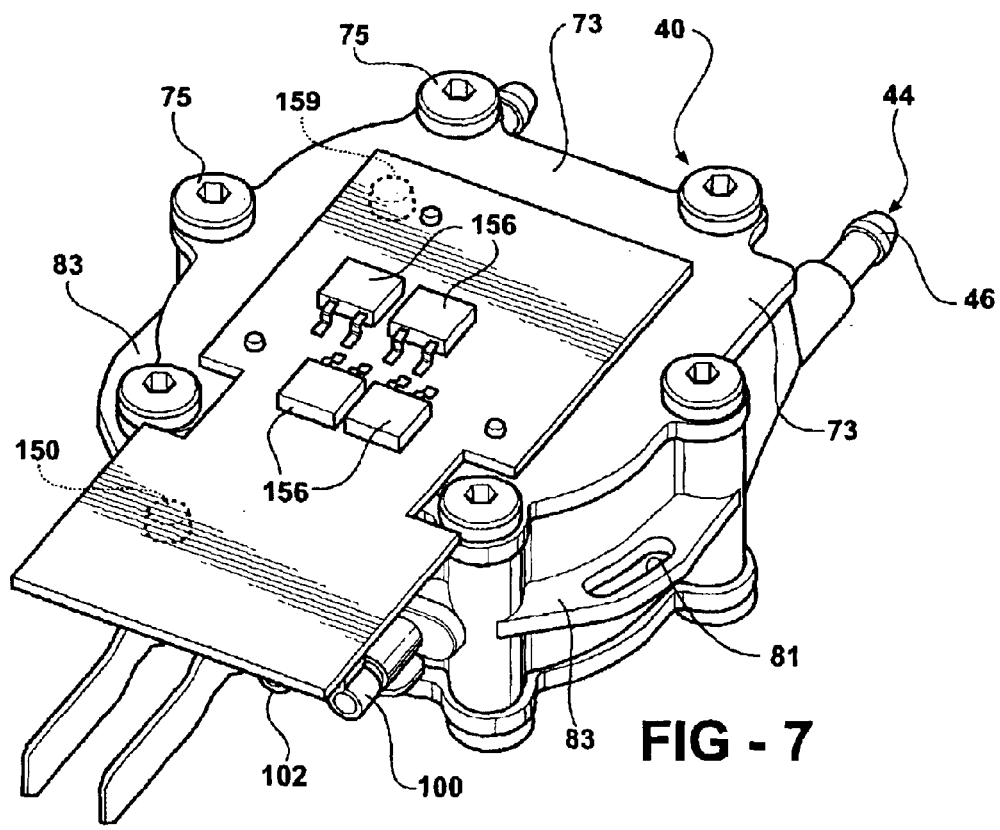
FIG. 7 is a perspective view of the circuit board side of the heater module, without the housing covers but including the circuit board.

As seen in FIGS. 4 and 7, one end 104, 106 and 107 of each heater element 100, 102 and 103, respectively, projects outwardly through the sidewall 84 of the body 40. The ends 104, 106 and 107 of the heater elements 100, 102 and 103, respectively, each have individual terminals 108 extending therefrom and joined thereto by soldering, welding, etc., for connection to mating sockets or contact spring mounted on a printed circuit board 150, itself mounted by means of fasteners, i.e., screws, rivets, or adhesives, etc., to an exterior surface of the plate 73. Conductive traces in the printed circuit board 150 are connected to sockets or contacts which receive the terminals 108. Two of the connector terminals 70 are soldered to the printed circuit board 150 to receive power, ground and control signals from the vehicle electrical system.

Figure 9:
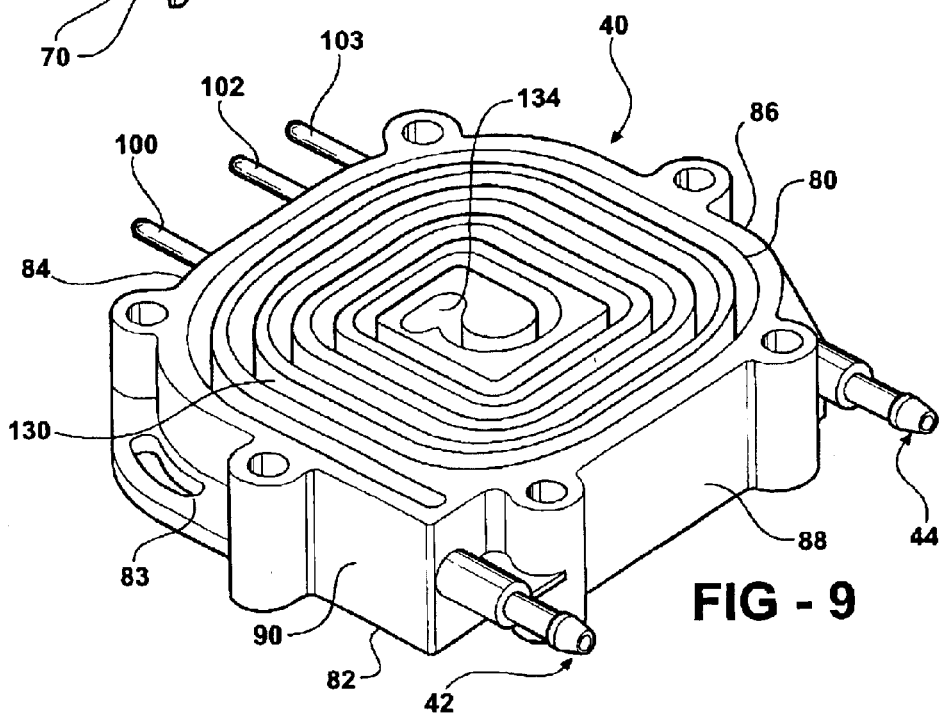
FIG. 9 is a top perspective view of one surface of the heater module thermal mass.
Figure 10:
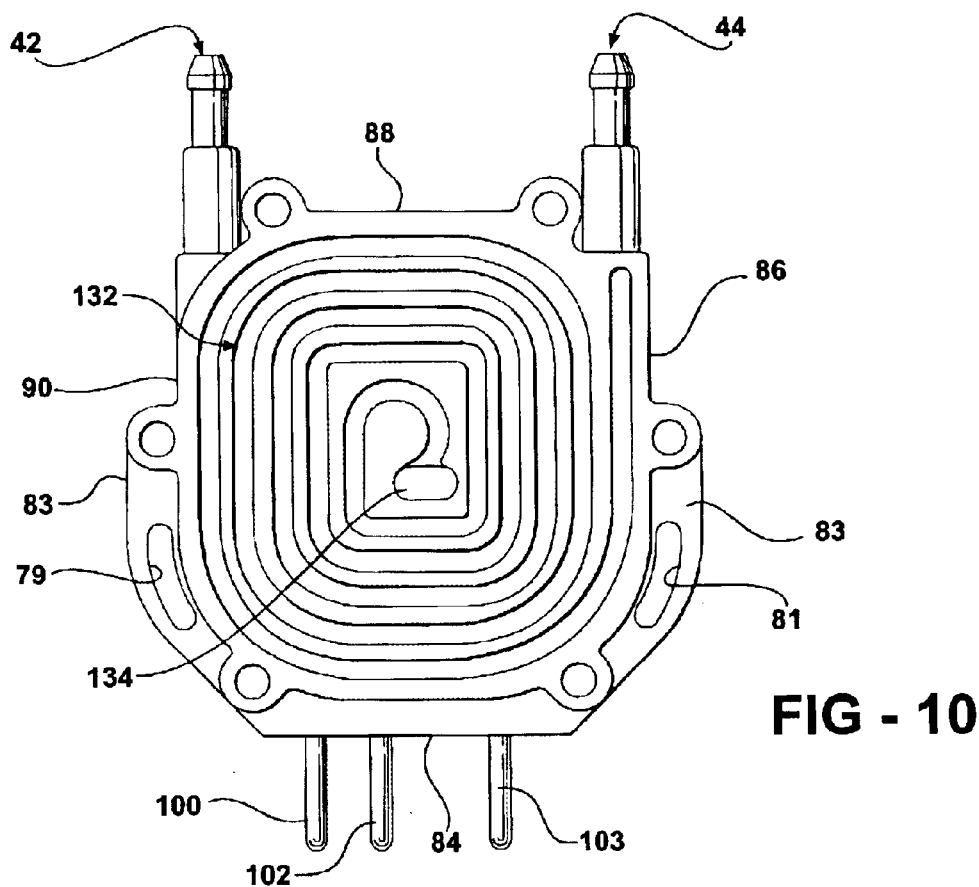
FIG. 10 is a bottom elevational view of the heater module thermal mass.
Figure 11:
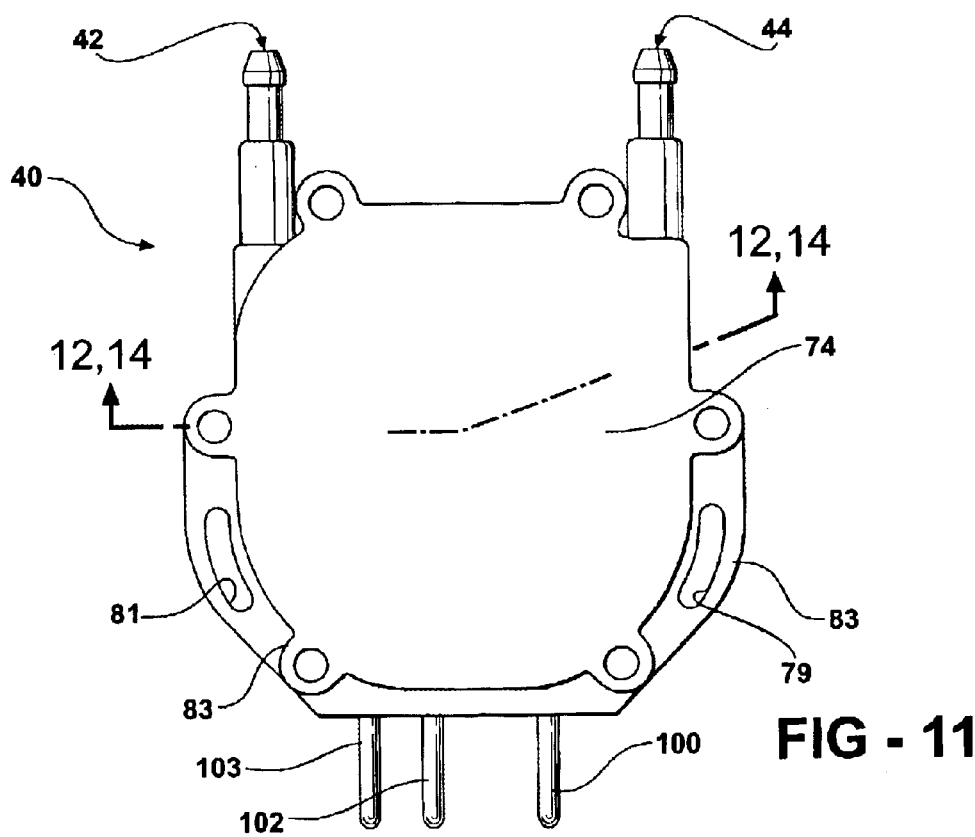
FIG. 11 is a plan view of the heater module shown in FIG. 8.

As shown in FIGS. 9 and 10, the thermally conductive mass 40 includes a fluid flow channel or path which extends from the inlet 42 to the outlet 44. The fluid flow path is, by example, a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternately create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

As shown in FIG. 10, the second fluid flow channel 132 has a substantially identical spiral shape. However, fluid flow through the second fluid flow channel 132 is in an outward spiral direction from the bore 134 to the outlet 44.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 65° to 70° C. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, multiple heater elements, with two or three heater elements, 100, 102 and 103, being described by way of example only, have been found to be most advantageous. The controller 28 can activate all of the plurality of heater elements 100, 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of 65° to about 75° C. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle engine is running, or the engine is running and a dashboard mounted switch is activated, the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Although the controller 28 can provide separate switchable signals to each of the heater elements 100, 102 and 103, in order to control each heater element 100, 102 and 103 separately under program or logic control, one alternate approach includes a bi-metal element or a switch mounted between the power connections to one terminal 108 and each of the other terminals 108 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

Although the following description of the use of high amperage switching devices known as MOSFETs, are used as part of the controller 28 and to provide the necessary high current, typically 50 amps at 12 volts, to the heating elements 100, 102 and 103 in the thermal mass 40, other high amperage switching devices may also be employed. Any number of MOSFETs 156 can be mounted in any configuration on the printed circuit board 150.

A plurality of bores 158 are optionally formed through the printed circuit board 150. The bores 158 improve heat flow between the switching devices on the printed circuit board (PCB) 150 and the underlying first plate 73.

Figure 3:
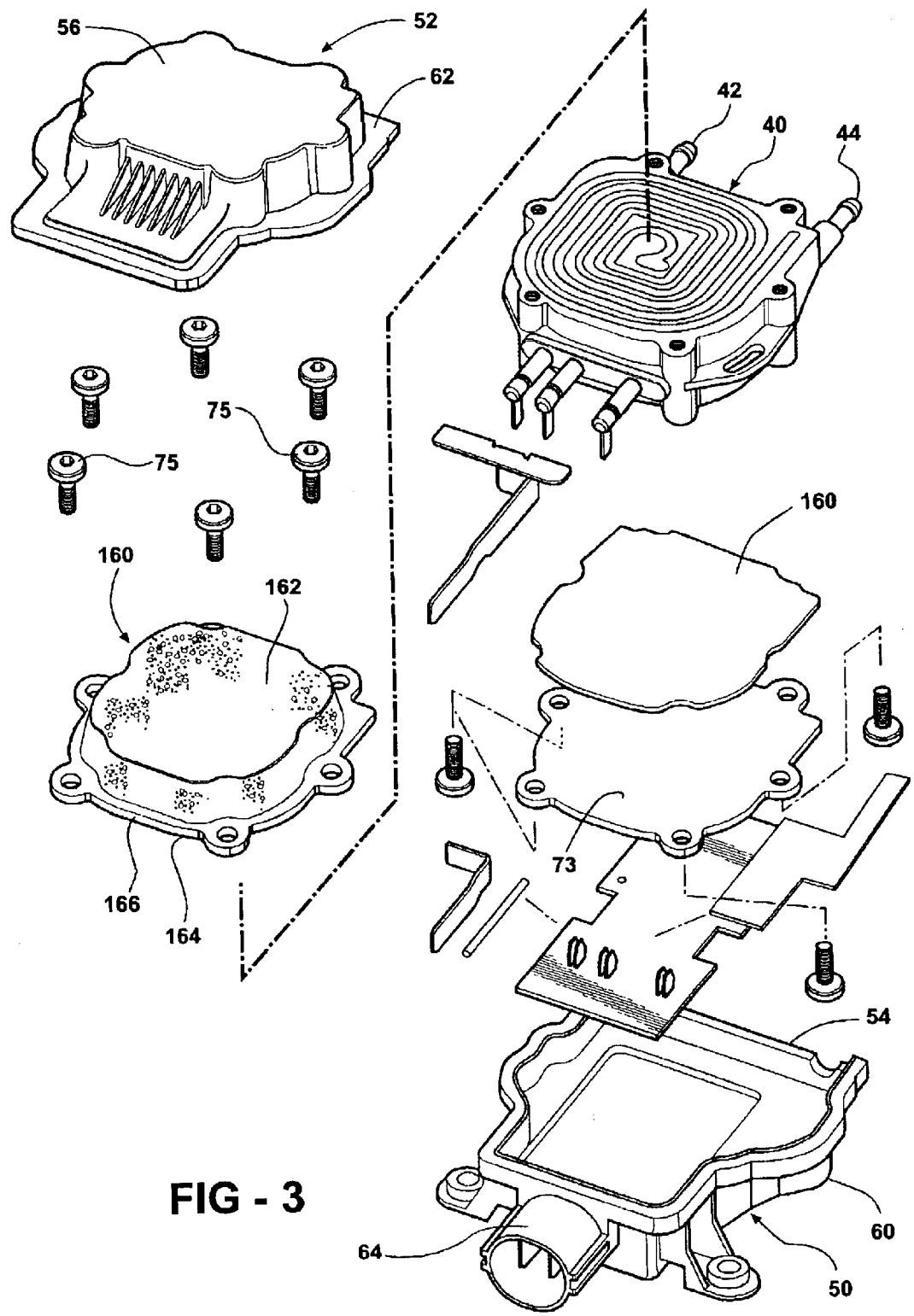
FIG. 3 is an exploded perspective view of the heater module shown in FIG. 2.
Figure 8:
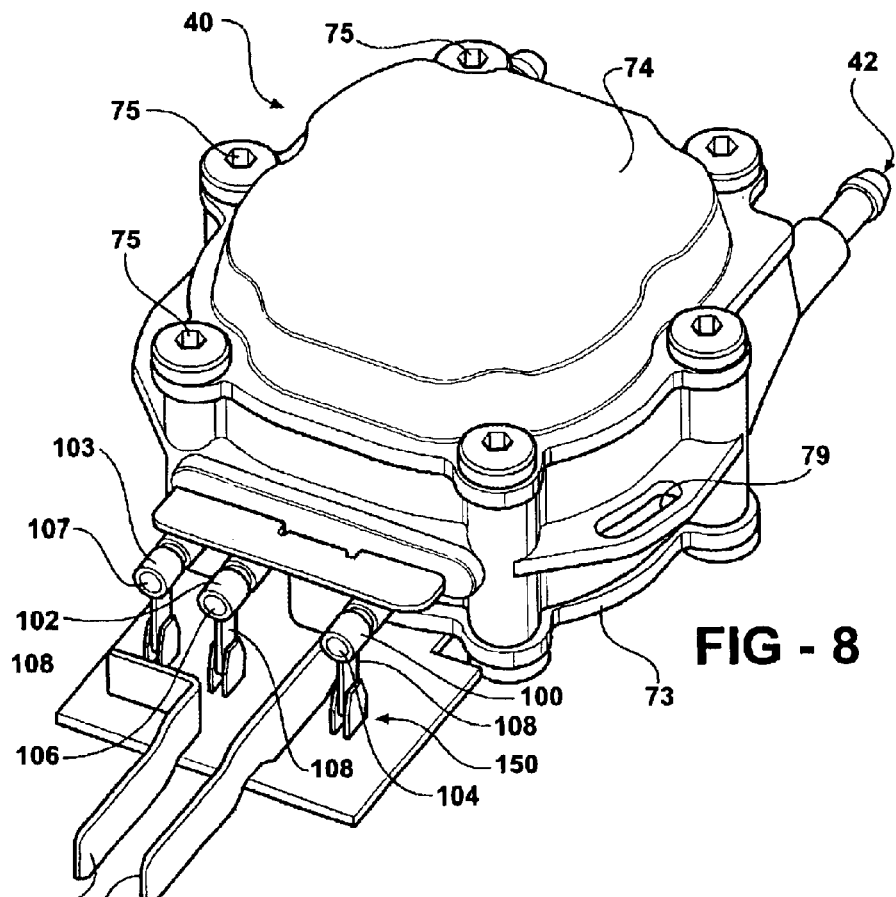
FIG. 8 is a perspective view of the opposite side of the heater module shown in FIG. 8.

To further enhance transfer of the heat generated by the MOSFETs 156 to the first plate 140, a highly conductive pad or plate 161, hereafter referred to as a sill pad 161, is interposed in contact between the printed circuit board 150 and the first plate 23 as shown in FIGS. 3, 8 and 9. The sill pad 161 typically has a planar shape and dimensions to extend over at least a portion of the first plate 73. The pad 161 isolates stray electrical currents to negative ground through the screws 75, provides a positive contact between the MOSFETs and the thermal mass 40, and stabilizes heat loss through the adjacent cover by maintaining the temperature of the plate 73 at a higher temperature to thereby create a lower temperature differential or gradient with respect to the thermal mass 40.

The sill pad 161 preferably has a higher thermal conductivity than the thermal conductivity of the plate 73 to efficiently draw heat generated by the MOSFETs 156 to the plate 73 thereby maintaining the temperature of the plate 73 at an elevated temperature. This elevated temperature of the plate 73 is higher than the normal temperature of the plate 73 caused by heat escaping from the sides of the thermal mass 40 around the seals 71 and 72.

A temperature sensor 159, such as a PTC, is mounted on the printed circuit board 150, typically over or adjacent to the bores 158. The temperature sensor 159 measures the temperature of the printed circuit board 150 and provides a temperature proportional signal to the controller 28 which is used by the controller 28 to control the on/off cycle of the heater elements 100, 102 and 103.

It is known that during sub-freezing temperatures, wash fluids which are formed substantially of water are subject to freezing. The expansion of the frozen or semi-frozen fluid causes pressure to be exerted against the surrounding components of the heater module 10 which could lead to leaks or to the complete destruction of the heater module 10. As shown in FIGS. 3, 5 and 11–14, a fluid expansion means 160 is carried in the heater module 10 for reversibly allowing expansion of the fluid in the fluid flow path when the fluid changes phase from a liquid to a substantially solid state.

Figure 5:
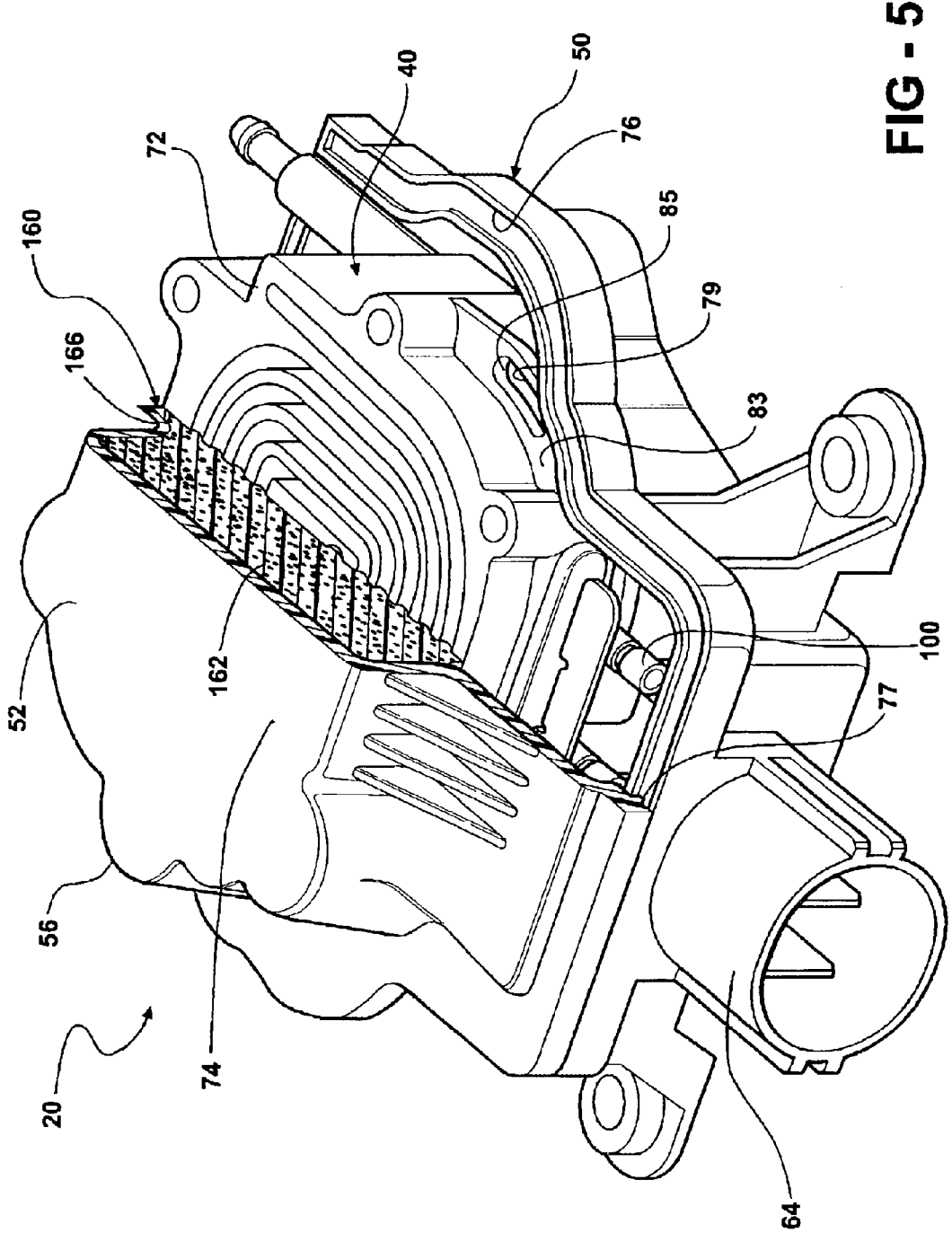
FIG. 5 is a partially broken away, perspective view of the heater module shown in FIG. 4, with the opposite surface oriented upward.
Figure 6:
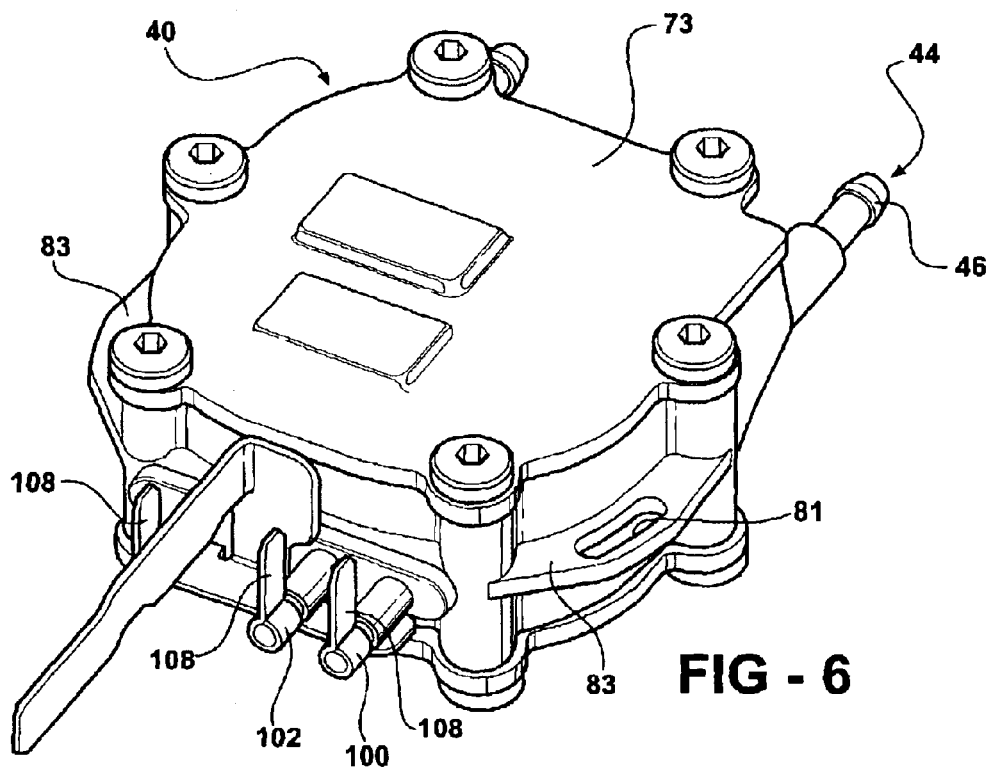
FIG. 6 is a perspective view of the bottom side of the heater module of the present invention, without the housing covers and the circuit board.
Figure 12:
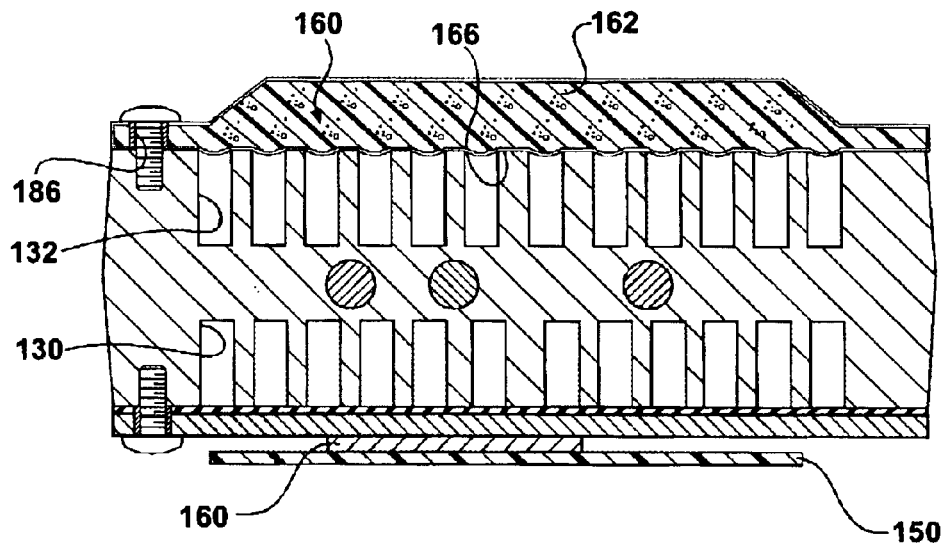
FIG. 12 is a cross-sectional view generally taken along line 12—12 in FIG. 11.

As shown in FIGS. 3, 5 and 12, the heat module 10 is provided with a fluid expansion means 160 which forms at least one of two closures surrounding and joined to the thermal mass 40. The cover 160 is formed of a compressible material with sufficient rigidity to resist compression when acted on by the normal pressures of fluid flow through the thermal mass 40. The material forming the fluid expansion member 160 also has shape memory so as to be able to return to its nominal shape when the fluid in the thermal mass 40 changes phase back to its original liquid state.

The member 160 may be formed of any suitable energy absorbing foam. For example, a polyvinyl chloride allied foam, trade name C/3002 or C-3201 from Specialty Composites Division Cabot Safety Corp. Indianapolis, Ind. 46254 maybe advantageously employed. This material typically has a closed cell interior and thicker outer surfaces or outer skins.

As shown in FIGS. 3 and 12, the element 160 has a substantially circular peripheral edge and an uncompressed thickness of approximately 10–12 mm. The diameter of the fully uncompressed central portion 162 of the element 160 is selected to that an inner surface 164 substantially covers all of the open ends of the fluid flow channels in the thermal mass 40.

According to a unique feature of the present invention, a peripheral edge portion 166 of the element 160 is further compressed after molding to its desired uncompressed shape under heat and pressure to increase the density of the peripheral edge portion 166 while reducing its thickness to about 3.0–4.0 mm. The peripheral edge portion 166 overlays the peripheral edge portion of the thermal mass 40. Bores 168 may be formed through the peripheral edge portion 166 for alignment with the bores in the mass 40 and receive a fastener, such as a screw to secure the element 160 to the thermal mass 40 in the same manner as the opposite plate 74. Internally threaded inserts or sleeves may be mounted in the bores 168 for added strength in receiving the screws.

In operation, the element 160 forms one of the plates on the thermal mass 40 with the inner surface 164 overlaying and substantially closing the open ends of the fluid flow channels in the thermal mass 40. However, when the fluid in the thermal mass 40 undergoes a phase change to a solid state, the element 160 will compress at least in the areas of the channels in the thermal mass 40 as shown in phantom in FIG. 12 to provide space for the expanding fluid without exerting excessive force on the joined connections to the thermal mass 40. The inherent shape memory of the element 160 will allow all compressed portions from the inner surface 160 to expand back to their nominal shape thereby providing a relatively smooth inner surface 160 which substantially closes off the open ends of the channels of the thermal mass 40 when the fluid reverses phase back to its normal liquid state.

Figure 13:
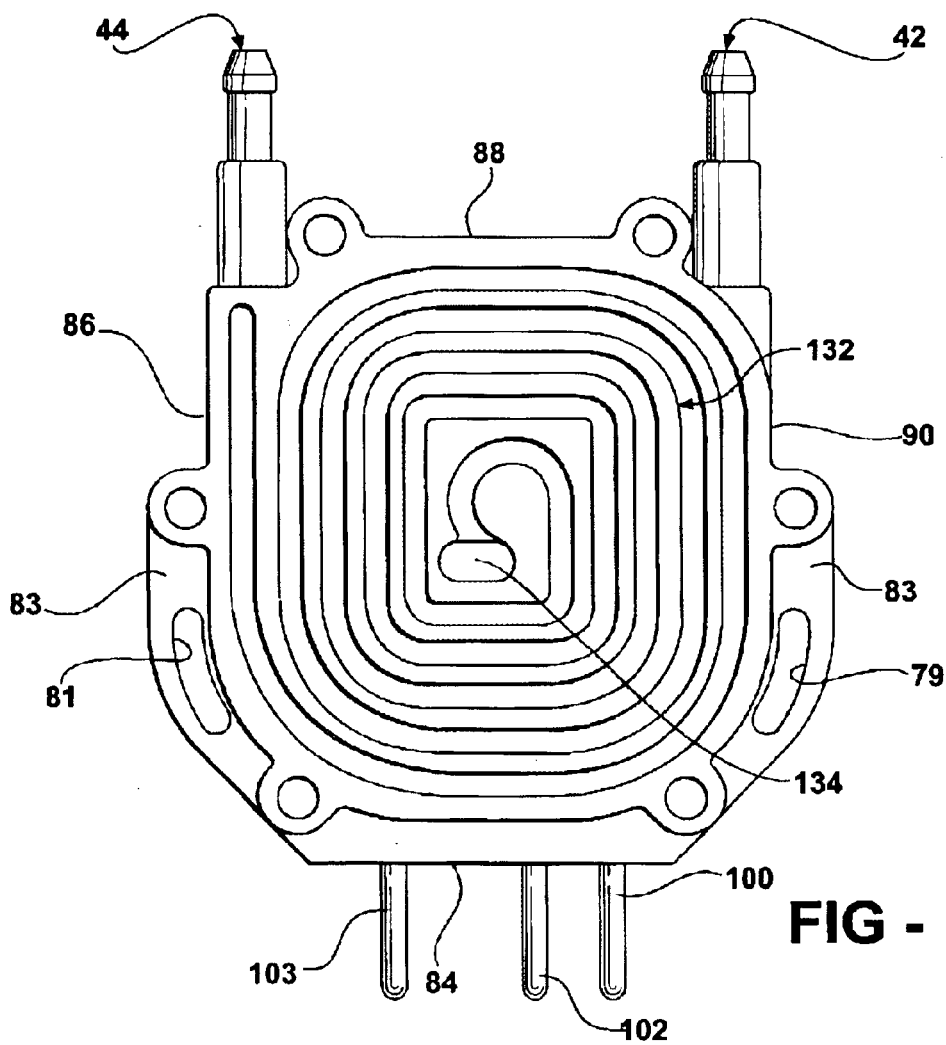
FIG. 13 is a plan view of the inside surface of the fluid expansion means according to one aspect of the invention.

Another aspect of the present invention is shown in FIG. 13 in which the inner surface 164 of the element 160 which overlays and contacts the exterior surface of the thermal mass 40 surrounding and disposed in between the fluid flow channels in the mass 40, if formed with a pattern of raised and recessed portions having substantially the same shape as the fluid flow channel formed in one surface of the thermal mass 40. Thus, the spiral shape described above as an example of one form of the fluid flow channel in the thermal mass 40 may be replicated in a reverse form in the surface 164. This causes raised portions of the pattern 182 in the surface 164 to fit within the open ends of the fluid flow channel in the thermal mass 40, with the adjacent and intermediate recessed portions of the pattern 182 disposed over and possibly in contact with the adjacent solid sections of the thermal mass between sections of the fluid flow channel. The pattern 182 allows the element 160 to be easily located and seated on the thermal mass 40 thereby automatically aligning the bores in the peripheral edge portion of the element 160 with the bore in the thermal mass 40. It will be understood that the spiral pattern formed in the inner surface 164 of the element 160 may also comprise a partial spiral pattern having spaced portions which do not form a complete spiral, but are nevertheless positioned to orient the element 160 through engagement with the channels in the thermal mass 40.

Referring now to FIGS. 14 and 15, there is depicted yet another embodiment of the present invention. In this embodiment, the fluid expansion element 160 is mounted in registry or contact with one surface of the thermal mass 40 as described above in the preceding aspects of the present invention. In this aspect of the present invention, however, a compression means, such as a plate 180, is mounted over the outer surface of the fluid expansion element 160 and secured to the thermal mass 40 by fastening means 182 in a manner to apply a compressive force on the fluid expansion element 160 against the thermal mass 40.

As shown in FIG. 14, the plate 180 has a shape complementary to the shape of the outer surface and periphery of the fluid expansion element 160. Preferably the plate 180 is formed of a lightweight, material, such as a suitable plastic which is capable of resisting the ambient temperatures of an automotive environment.

The peripheral edge 184 of the plate 180 is formed with a plurality of through bores 186, each located at a position to align with the bores in the thermal mass 40 as well as the bores 188 in the fluid expansion element 160.

Preferably, the plate 180 is formed with at least one or a pair of radially spaced ribs. Two ribs 190 are shown by way of example only. The inner surface of each rib 190 engages the peripheral edge portion of the fluid expansion means 160. The ribs 190 apply a compressive force to the peripheral edge of the fluid expansion element 160 sealing the fluid expansion element against the outer surface of the thermal mass 40 when the fasteners 182 are engaged through the bores 186. The fasteners 182 may comprise any suitable fastener, such as a nut and bolt.

Referring now to FIG. 16, there is depicted yet another aspect of the present invention. In this aspect, compression of the fluid expansion element 160 on the thermal mass 40 is achieved by means of a compression means 200 in the form of a ring having a peripheral band 202 substantially complementary to the shape of the peripheral edge portion of the fluid expansion element 160. A plurality of apertures 204 are formed in the band 202 and align with the apertures in the fluid expansion element 160. The ring 200 may also employ the rib or ribs 190 shown in FIGS. 14 and 15.

Preferably, the compression means 200 is formed of a high strength material, such a metal, by example, steel or stainless steel.

The compression means 200, when secured to the fluid expansion element 160 and the thermal mass 40 by the fasteners 75, applies a compressive force about the entire peripheral edge of the fluid expansion element 160 to seal the fluid expansion element 160 against the thermal mass 40.

In summary, there has been disclosed a fluid heater apparatus having a unique fluid expansion means which accommodates fluid expansion of the fluid flowing through the fluid heater when the fluid undergoes a phase change to a solid state. The thermal expansion means has shape memory to reassume its normal shape after the fluid returns to a liquid phase.

What is claimed is:

1. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the thermally conductive mass so that fluid in the fluid flow path absorbs heat from the thermally conductive mass;

the fluid flow path having an open portion opening to the exterior of the thermally conductive mass;

fluid expansion means, disposed over the open portion of the fluid flow path in the thermally conductive mass for reversibly allowing expansion of fluid in the fluid flow path when the fluid undergoes a phase change to a solid state; and means for fixing the peripheral edge of the fluid expansion means to the thermally conductive mass.

2. The heater apparatus of claim 1 wherein:

the fluid expansion means has a peripheral edge; and the fixing means fixing the peripheral edge to the mass.

3. The heater apparatus of claim 1 wherein:

the fluid expansion means comprises a body formed of a compressible material.

4. The heater apparatus of claim 3 wherein:

the compressible material is formed of a closed cell foam.

5. The heater apparatus of claim 3 wherein:

the compressible material as a first lower density portion disposed over the fluid flow path in the mass and a second higher density portion in the peripheral edge.

6. The heater apparatus of claim 1 further comprising:

a housing formed of first and second covers fixable to each other and surrounding the thermal mass, at least one of the covers having a central portion defining an interior recess receiving the fluid expansion means.

7. The heater apparatus of claim 6 wherein:

the fluid expansion means is formed of a closed cell foam.

8. The heater apparatus of claim 1 wherein the fluid flow path comprises:

a first flow path portion extending across one surface of the thermally conductive mass;

a second flow path portion extending across an opposed surface of the thermally conductive mass, the first and second flow path portions disposed in fluid flow communication; and the fluid expansion means including at least a first fluid expansion element associated with one of the first and second flow path portions.

9. The heater apparatus of claim 8 wherein:

the first and second flow path portions are disposed in fluid flow communication substantially at the center of the thermally conductive mass.

10. The heater apparatus of claim 1 wherein the heating means comprises:

at least one heater element mounted in the mass.

11. The heater apparatus of claim 1 wherein the heating means comprises:

a plurality of heater elements mounted in the mass.

12. The heater apparatus of claim 11 further comprising:

a controller for controlling the activation of each of the heater elements.

13. The heater apparatus of claim 1 wherein:

the heating means is disposed in the thermally conductive mass and substantially encompassed by the fluid flow path.

14. The heater apparatus of claim 1 further comprising:

the fluid flow path defining a labyrinthian path between the inlet and the outlet; and the fluid expansion means having a surface engagable over the open ends of the fluid flow path in the thermally conductive mass, the surface having a complementary labyrinthian pattern sealingly engagable with the open end portion of the fluid flow path in one surface of the thermally conductive mass.

15. The heater apparatus of claim 1 further comprising:

a plate having a central portion accommodating a portion of the fluid expansion means, the plate joinable with the fluid expansion means by the fixing means to one surface of the thermally conductive mass.

16. The heater apparatus of claim 15 further comprising:

at least one bore extending through the fluid expansion means to allow fluid flow to contact the plate.

17. The heater apparatus of claim 1 further comprising:

compression means, fixed to the fluid expansion means and the thermally conductive mass, for applying compression force to the fluid expansion to seal the fluid expansion means on the thermally conductive mass.

18. The heater apparatus of claim 17 wherein the compression means comprises:

a rigid ring member having apertures for the fixing means, the rigid member mountable on a peripheral edge of the fluid expansion means.

19. The heater apparatus of claim 17 wherein the compression means comprises:

a plate having a central portion accommodating a portion of the fluid expansion means, the plate joinable with the fluid expansion means by the fixing means to one surface of the thermally conductive mass.

20. The heater apparatus of claim 19 wherein:

the plate has apertures for receiving the fixing means.

21. The heater apparatus of claim 17 wherein:

the plate has a complementary shape to the fluid expansion means.

22. The heater apparatus of claim 19 wherein the plate further comprises:

at least one rib depending from a peripheral edge of a plate to forcibly engage the fluid expansion means to apply compressive force to a peripheral edge of the fluid expansion means.

23. The heater apparatus of claim 17 wherein the plate further comprises:

a pair of ribs depending from a peripheral edge of a plate to forcibly engage the fluid expansion means to apply compressive force to a peripheral edge of the fluid expansion means;

a plurality of through bores formed between the pair of ribs and alignable with the bores in the thermally conductive mass for receiving the fixing means therethrough.

24. The heater apparatus of claim 18 wherein the ring member further comprises:

at least one rib depending from a peripheral edge of a plate to forcibly engage the fluid expansion means to apply compressive force to a peripheral edge of the fluid expansion means.

25. A heater apparatus for heating fluid, the heater apparatus comprising:

a thermally conductive mass;

a fluid flow path formed of a first flow path portion extending across one surface of the thermally conductive mass and a second flow path portion extending across an opposed surface of the thermally conductive mass, the first and second flow path portions disposed in fluid flow communication through the thermally conductive mass, the fluid flow path defined by open-ended channels formed in the thermally conductive mass, the open-ends of the channels facing outward from the thermally conductive mass;

at least one heating element thermally mounted in the thermally conductive mass and substantially contacted by the mass, the heating element imparting heat to the thermally conductive mass so that fluid in the first and second flow path portions absorbs heat from the thermally conductive mass;

control means, for activating the at least one heating element; and fluid expansion means, coupled to the mass, for reversibly allowing expansion of fluid in the fluid flow path when the fluid undergoes a phase change to a solid state.

26. The heater apparatus of claim 24 wherein:

the fluid expansion means has a peripheral edge; and further including fixing means for fixing the peripheral edge to the mass.

27. The heater apparatus of claim 25 wherein:

the fluid expansion means comprises a body formed of a compressible material.

28. The heater apparatus of claim 27 wherein:

the compressible material is formed of a closed cell foam.

29. The heater apparatus of claim 27 wherein:

the compressible material as a first lower density portion disposed over the fluid flow path in the mass and a second higher density portion in the peripheral edge.

30. The heater apparatus of claim 25 further comprising:

a housing formed of first and second covers fixable to each other and surrounding the thermal mass, at least one of the covers having a central portion defining an interior recess receiving the fluid expansion means.

31. The heater apparatus of claim 30 wherein:

the fluid expansion means is formed of a closed cell foam.

32. The heater apparatus of claim 25 wherein:

the first and second flow path portions are disposed in fluid flow communication substantially at the center of the thermally conductive mass.

33. The heater apparatus of claim 25 wherein the at least one heating element comprises:
a plurality of heater elements thermally mounted in the mass.

34. The heater apparatus of claim 25 further comprising:
the fluid flow path defining a labyrinthian path between the inlet and the outlet; and
the fluid expansion means having a surface engagable over the open ends of the fluid flow path in the thermally conductive mass, the surface having a complementary labyrinthian pattern sealingly engagable with the open end portion of the fluid flow path in one surface of the thermally conductive mass.

35. The heater apparatus of claim 26 further comprising:
a plate having a central portion accommodating a portion of the fluid expansion means, the plate joinable with the fluid expansion means by the fixing means to one surface of the thermally conductive mass.

36. The heater apparatus of claim 35 further comprising:
at least one bore extending through the fluid expansion means to allow fluid flow to contact the plate.

37. The heater apparatus of claim 25 further comprising:
compression means, fixed to the fluid expansion means and the thermally conductive mass for applying compression to the fluid expansion to seal the fluid expansion means on the thermally conductive mass.

38. The heater apparatus of claim 37 wherein the compression means comprises:
a rigid ring member having apertures for the fixing means, the rigid member mountable on a peripheral edge of the fluid expansion means.

39. The heater apparatus of claim 37 wherein the compression means comprises:
a plate having a central portion accommodating a portion of the fluid expansion means, the plate joinable with the fluid expansion means by the fixing means to one surface of the thermally conductive mass.

40. The heater apparatus of claim 39 wherein:
the plate has apertures for receiving the fixing means.

41. The heater apparatus of claim 40 wherein:
the plate has a complementary shape to the fluid expansion means.

42. The heater apparatus of claim 39 wherein the plate further comprises:
at least one rib depending from a peripheral edge of a plate to forcibly engage the fluid expansion means to apply compressive force to a peripheral edge of the fluid expansion means.

43. The heater apparatus of claim 39 wherein the plate further comprises:
a pair of ribs depending from a peripheral edge of a plate to forcibly engage the fluid expansion means to apply compressive force to a peripheral edge of the fluid expansion means;
a plurality of through bores formed between the pair of ribs and alignable with the bores in the thermally conductive mass for receiving the fixing means therethrough.

44. A vehicle window wash apparatus comprises:
a fluid source for supplying wash fluid;
a fluid discharge device fluidically coupled to the fluid source for discharging fluid from the reservoir;
a heater means disposed in fluid flow communication between the fluid source and the fluid discharge device; and
a controller, coupled to the heater means, for supplying power to the heater means;
the heater means including:
a fluid flow path formed in the mass between the inlet and the outlet, the fluid flow path substantially enveloping the heating means so that fluid in the fluid flow path absorbs heat from the thermally conductive mass;
a thermally conductive mass having an inlet and an outlet;
at least one heating element thermally mounted in the thermally conductive mass and substantially contacted by the mass, the heating means imparting heat to the thermally conductive mass so that fluid in the first and second flow path portions absorbs heat from the thermally conductive mass;
control means, connected to the heating element, for activating the heating element, the fluid flow path having an open end opening to the exterior of the thermally conductive mass;
a housing carrying the thermally conductive mass in an interior cavity;
fluid expansion means, fixed to the mass, for reversibly allowing expansion of fluid in the fluid flow path when the fluid undergoes a phase change to a solid state.

45. The heater apparatus of claim 44 wherein:
the fluid expansion means has a peripheral edge; and
the fixing means fixing the peripheral edge to the mass.

46. The heater apparatus of claim 44 wherein:
the fluid expansion means comprises a body formed of a compressible material.

47. The heater apparatus of claim 46 wherein:
the compressible material is formed of a closed cell foam.

48. The heater apparatus of claim 46 wherein:
the compressible material as a first lower density portion disposed over the fluid flow path in the mass and a second higher density portion in the peripheral edge.

49. The heater apparatus of claim 44 further comprising:
a housing formed of first and second covers fixable to each other and surrounding the thermal mass, at least one of the covers having a central portion defining an interior recess receiving the fluid expansion means.

50. The heater apparatus of claim 49 wherein:
the fluid expansion means is formed of a closed cell foam.

51. The heater apparatus of claim 44 wherein the fluid flow path comprises:
a first flow path portion extending across one surface of the thermally conductive mass;
a second flow path portion extending across an opposed surface of the thermally conductive mass, the first and second flow path portions disposed in fluid flow communication; and
the fluid expansion means including at least a first fluid expansion element associated with one of the first and second flow path portions.

52. The heater apparatus of claim 51 wherein:
the first and second flow path portions are disposed in fluid flow communication substantially at the center of the thermally conductive mass.

53. The heater apparatus of claim 44 wherein:
the heating means is disposed in the thermally conductive mass and substantially encompassed by the fluid flow path.

54. The heater apparatus of claim 44 further comprising:

the fluid flow path defining a labyrinthian path between the inlet and the outlet; and the fluid expansion means having a surface engagable over the open ends of the fluid flow path in the thermally conductive mass, the surface having a complementary labyrinthian pattern sealingly engagable with the open end portion of the fluid flow path in one surface of the thermally conductive mass.

55. The heater apparatus of claim 44 further comprising:

a plate having a central portion accommodating a portion of the fluid expansion means, the plate joinable with the fluid expansion means by the fixing means to one surface of the thermally conductive mass.

56. The heater apparatus of claim 55 further comprising:

at least one bore extending through the fluid expansion means to allow fluid flow to contact the plate.

57. The heater apparatus of claim 44 further comprising:

compression means, fixed to the fluid expansion means and the thermally conductive mass for applying compression to the fluid expansion to seal the fluid expansion means on the thermally conductive mass.

58. The heater apparatus of claim 57 wherein the compression means comprises:

a rigid ring member having apertures for the fixing means, the rigid member mountable on a peripheral edge of the fluid expansion means.

59. The heater apparatus of claim 57 wherein the compression means comprises:

a plate having a central portion accommodating a portion of the fluid expansion means, the plate joinable with the fluid expansion means by the fixing means to one surface of the thermally conductive mass.

60. The heater apparatus of claim 59 wherein:

the plate has apertures for receiving the fixing means.

61. The heater apparatus of claim 57 wherein:

the plate has a complementary shape to the fluid expansion means.

62. The heater apparatus of claim 57 wherein the plate further comprises:

at least one rib depending from a peripheral edge of a plate to forcibly engage the fluid expansion means to apply compressive force to a peripheral edge of the fluid expansion means.

63. The heater apparatus of claim 57 wherein the plate further comprises:

a pair of ribs depending from a peripheral edge of a plate to forcibly engage the fluid expansion means to apply compressive force to a peripheral edge of the fluid expansion means;

a plurality of through bores formed between the pair of ribs and alignable with the bores in the thermally conductive mass for receiving the fixing means therethrough.

* * * * *